United States Patent
Kleegrewe et al.

(10) Patent No.: US 7,954,391 B2
(45) Date of Patent: Jun. 7, 2011

(54) METHOD FOR TESTING THE FUNCTIONALITY OF ARMATURES

(75) Inventors: Thomas Kleegrewe, Minden (DE); Andreas Stelter, Minden (DE); Martin Dahl, Espelkamp (DE); Andreas Wahlmann, Meerbeck (DE); Heiko Kresse, Obernkirchen (DE)

(73) Assignee: ABB AG, Manheim (DE)

( * ) Notice: Subject to any disclaimer, the term of this patent is extended or adjusted under 35 U.S.C. 154(b) by 406 days.

(21) Appl. No.: 12/144,792

(22) Filed: Jun. 24, 2008

(65) Prior Publication Data
US 2008/0314170 A1  Dec. 25, 2008

(30) Foreign Application Priority Data

Jun. 25, 2007 (DE) .................. 10 2007 029 148

(51) Int. Cl.
*G01M 19/00* (2006.01)
*F15B 19/00* (2006.01)
*F16K 37/00* (2006.01)
*G01R 31/06* (2006.01)

(52) U.S. Cl. ........................... 73/865.9; 324/545
(58) Field of Classification Search .......... 73/168, 73/865.9; 324/545; 702/115
See application file for complete search history.

(56) References Cited

U.S. PATENT DOCUMENTS

| | | | | |
|---|---|---|---|---|
| 2,380,894 A | * | 7/1945 | Colman | ................ 178/3 |
| 3,135,862 A | * | 6/1964 | Bishop et al. | ............. 235/409 |
| 6,409,094 B2 | * | 6/2002 | Tojo et al. | .................. 239/5 |
| 6,435,022 B1 | | 8/2002 | Albuaijan | |
| 7,486,496 B2 | * | 2/2009 | Gauxmann et al. | ...... 361/147 |
| 2006/0067810 A1 | | 3/2006 | Molitor | |

FOREIGN PATENT DOCUMENTS

| DE | 602 08 045 T2 | 8/2006 |
|---|---|---|
| WO | WO 01/59346 A1 | 8/2001 |
| WO | WO 02/082193 A2 | 10/2002 |

OTHER PUBLICATIONS

German Examination Report, in German, refers to 3 of the references cited above, no use of X, Y, or A codes apparent therein, 4 pages.

\* cited by examiner

*Primary Examiner* — Thomas P Noland
(74) *Attorney, Agent, or Firm* — Buchanan Ingersoll & Rooney PC

(57) ABSTRACT

The disclosure relates to a method for testing the functionality of armatures, e.g., of safety armatures, in process control systems which are assigned a test device for implementing partial stroke testing and which are connected to a control device, which brings about actuation, in accordance with regulations, of the safety armature in an emergency. Prior to the start of the implementation of the partial stroke testing, a request signal is transmitted from the test device to the control device which is answered by the control device with an enable signal, the enable signal being issued as a function of the current process sequence at the armature.

8 Claims, 2 Drawing Sheets

METHOD FOR TESTING THE FUNCTIONALITY OF ARMATURES

RELATED APPLICATION

This application claims priority under 35 U.S.C. §119 to German Patent Application No. 10 2007 029 148.7 filed in Germany on Jun. 25, 2007, the entire content of which is hereby incorporated by reference in its entirety.

TECHNICAL FIELD

The disclosure relates to a method for testing the functionality of armatures, e.g., safety armatures, in process control systems.

BACKGROUND INFORMATION

Such safety armatures are used in process systems in order to bring devices in the process control system into a nonhazardous state in an emergency, for example in the event of failure of controlled armatures. In accordance with regulations, such safety armatures are only moved in an emergency. States which impede or prevent the movement of a safety armature are therefore regularly not directly detected.

In order to test whether a safety armature can move out of the permanent position at least up to a specific point in an unrestricted manner, the so-called partial stroke test is known from U.S. Pat. No. 6,435,022 B1. In this case, a safety armature is moved in a subsection of its working range, by means of which it is proven, at the instant of testing, that some of the hazardous faults which cannot be detected and which impede or prevent the movement of a safety armature are not present.

WO 01/59346 A1 has disclosed a test device for implementing the partial stroke testing which has a pushbutton, on whose actuation or by means of remote control the testing is initiated.

In this case there is the problem that the undetermined time of the testing disrupts the controlled process sequence. This is the case, for example, if in the case of a safety armature closing in an emergency, the testing takes place at the moment at which an exceptionally high quantity of the medium separated from the safety armature in an emergency is required for the process. Restricting the partial stroke to an actuating range of the safety armature by a process impediment being ruled out would restrict the significance of the testing. In the case of a safety armature which opens in an emergency, the testing could be implemented at a time at which the container which is deaerated or aerated by the safety armature in an emergency should not be opened. Deaerating applications include, for example, superatmospheric pressure armatures, and aerating applications include, for example, protective gas armatures.

SUMMARY

A method for testing the functionality of armatures is disclosed, e.g., of safety armatures, in which the influencing of the technical process is largely avoided.

A method for testing the functionality of armatures is disclosed, e.g., of safety armatures, in process control systems which are assigned a test device for implementing partial stroke testing and which are connected to a control device, which brings about actuation, in accordance with regulations, of the safety armature in an emergency, wherein, prior to the start of the implementation of the partial stroke testing, a request signal is transmitted from the test device to the control device, and wherein an enable signal is output by the control device at least upon request, the enable signal being issued as a function of the current process sequence at the armature.

In another aspect, a process control system is disclosed for testing the functionality of armatures. The system comprises a control device to control actuation of a safety armature in an emergency; and at least one assigned test device for implementing partial stroke testing and which is connected to the control device, which brings about actuation, in accordance with regulations, of the safety armature in an emergency, wherein, prior to the start of the implementation of the partial stroke testing, a request signal is transmitted from the test device to the control device, and wherein an enable signal is output by the control device at least upon the request.

BRIEF DESCRIPTION OF THE DRAWINGS

Further advantages and details of the disclosure will be explained in more detail below with reference to the exemplary embodiments. In the drawings required in this regard.

DETAILED DESCRIPTION

The disclosure is based on a safety armature, which is assigned a test device for implementing partial stroke testing and which is connected to a control device, which brings about actuation, in accordance with regulations, of the safety armature in an emergency.

The disclosure provides that, prior to the start of the implementation of the partial stroke testing, a request signal is transmitted from the test device to the control device. An enable signal is output by the control device at least upon request, the enable signal being issued as a function of the current process sequence at the armature. No testing is carried out until the enable signal is present. This means that the testing is always only carried out when the technical process is not impaired.

In accordance with a further feature of the disclosure, it is provided that the request signal is generated cyclically. As a result, continuous monitoring of the functionality of the safety armature is achieved.

In accordance with a further feature of the disclosure, it is provided that the request signal is generated automatically. Advantageously, manual interventions for maintaining the continuous monitoring of the functionality of the safety armature can thus be dispensed with.

In accordance with a further feature of the disclosure, it is provided that the enable signal is output whenever the current process sequence at the armature allows for fault-free testing. This feature makes it possible to implement the testing at the time of the request if the enable signal has already been output. Advantageously, delays between the request and the start of the testing are thus avoided.

Figure 1:
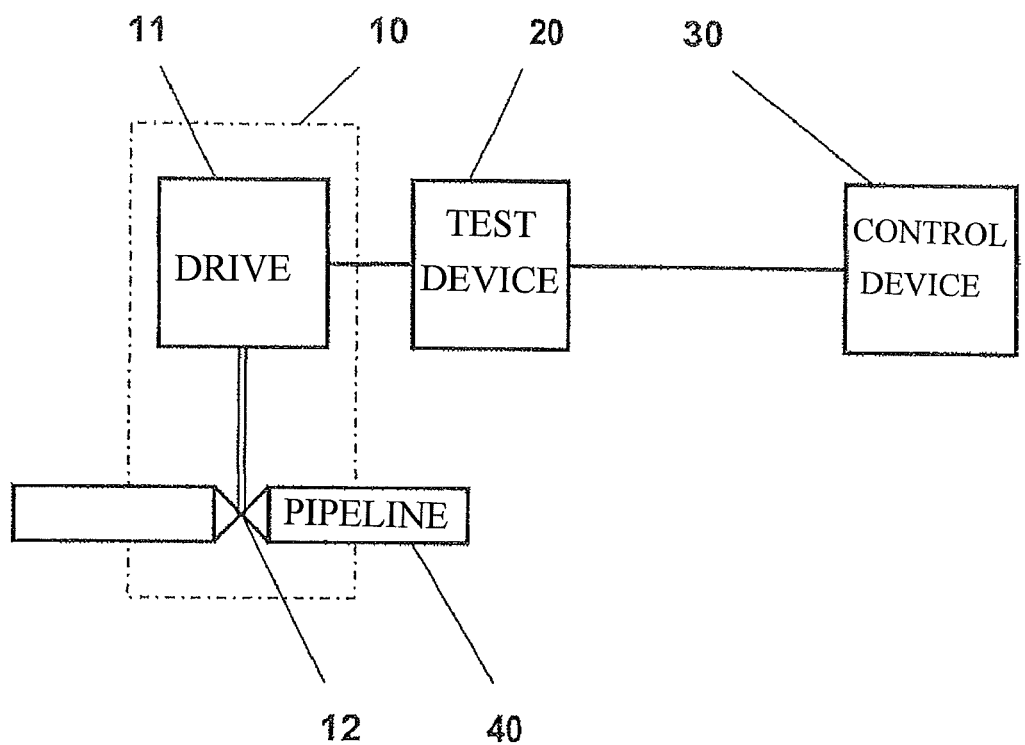
FIG. 1 shows a basic illustration of an exemplary system with a safety armature.

FIG. 1 is a basic illustration of an exemplary system with a safety armature 10, which is connected into a pipeline 40 for blocking or enabling throughflow through said pipeline. The safety armature 10 substantially comprises a drive 11 for actuating a valve 12, which enables or blocks the throughflow through the pipeline 40.

The safety armature 10 is assigned a test device 20 for implementing the partial stroke testing. The test device 20 is connected to a control device 30, which brings about actuation, in accordance with regulations, of the safety armature 10 in an emergency.

The safety armature 10 is arranged in addition to a process-controlled armature (not shown). In this case, a safety armature 10 which opens in an emergency is arranged in parallel with the controlled armature and a safety armature 10 which closes in an emergency is connected in series with the controlled armature.

Figure 2:
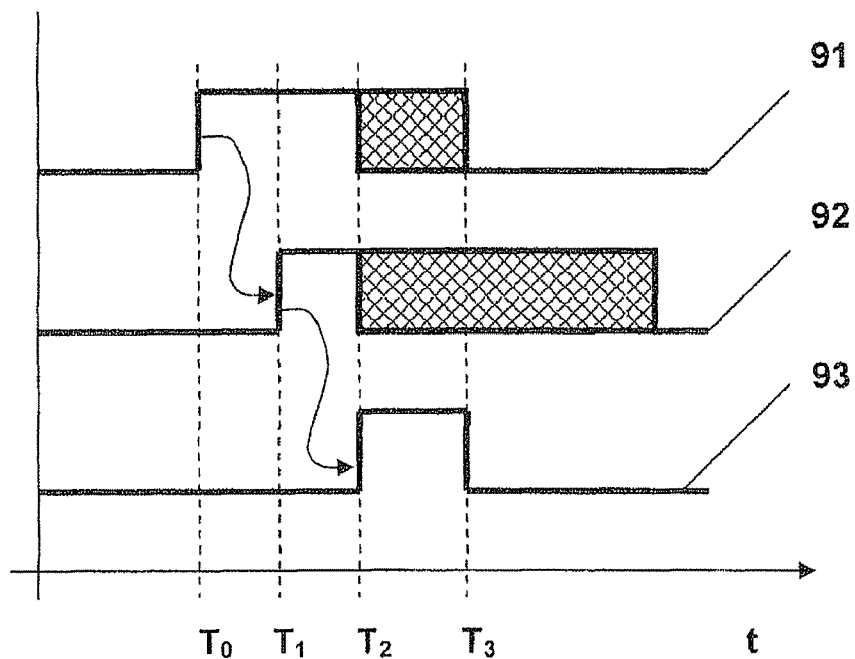
FIG. 2 shows an exemplary timing diagram for the enable process as a response.

In a first exemplary embodiment of the disclosure, it is provided, with reference to FIG. 2, that a request signal 91 is generated by the test device 20 and is transmitted to the control device 30. This step is illustrated in FIG. 2 by the rising flank of the request signal 91 at time To. Upon this request, the control device 30 emits an enable signal 92 as long as the current process sequence at the safety armature 10 allows testing. Enabling is identified by the rising flank of the enable signal 92 at time $T_1$. The presence of the request signal 91 and the enable signal 92 initiates the testing 93 beginning at time $T_2$ up to time $T_3$. The request signal 91 is canceled at the latest once the testing 93 has elapsed at time $T_3$. The canceling of the enable signal 92 depends on the current process sequence at the safety armature 10.

In this case, the time To up to time $T_3$ merely represents a exemplary qualitative sequence of states and does not represent a quantitative indication of the onset of a specific event.

Figure 3:
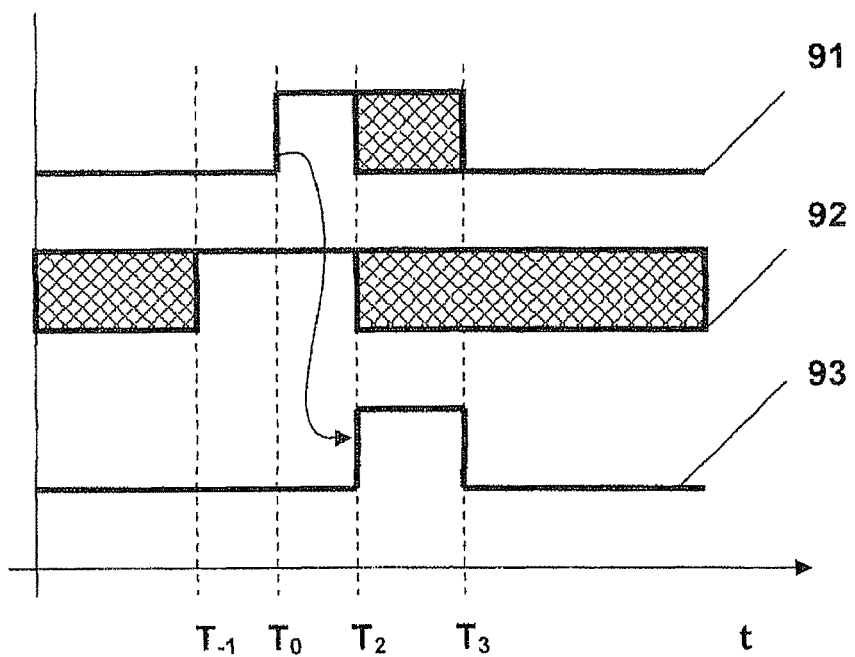
FIG. 3 shows an exemplary timing diagram for the leading enable process.

In a second exemplary embodiment of the disclosure, it is provided, with reference to FIG. 3, that an enable signal 92 is output, independently of a request, by the control device 30 as a function of the current process sequence at the safety armature 10. In FIG. 3, the presence of the enabling is assumed at time $T_{-1}$. If a request 91 is generated at a later time $T_0$ and this request is met with enabling 91, the testing 93 is initiated, and this testing extends over the period from $T_2$ to $T_3$.

If the enabling 92 at time $T_0$ of the request 91 has failed, the further sequence is in accordance with the illustration in FIG. 2.

In a further configuration of the disclosure, it can be provided that the enabling 92 has a rate time which takes into consideration the current process sequence at the safety armature 10.

In a further-reaching configuration of the disclosure, it can be provided that the enabling 92 is transmitted electrically. For example, it can be provided that the enabling 92 is transmitted as a data item by means of a communication protocol between the control device 30 and the test device 20.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE SYMBOLS

| | |
|---|---|
| 10 | Armature |
| 11 | Drive |
| 12 | Valve |
| 20 | Test device |
| 30 | Control device |
| 40 | Pipeline |
| 91 | Request signal |
| 92 | Enable signal |
| 93 | Testing |
| $T_{-1}$ to $T_3$ | Times |

What is claimed is:

1. A method for testing the functionality of armatures in process control systems which are assigned a test device for implementing partial stroke testing and which are connected to a control device, which brings about actuation, in accordance with regulations, of the safety armature in an emergency, wherein, prior to the start of the implementation of the partial stroke testing, a request signal is transmitted from the test device to the control device, and wherein an enable signal is output by the control device at least upon request, the enable signal being issued as a function of the current process sequence at the armature.

2. The method as claimed in claim 1, wherein the request signal is generated cyclically.

3. The method as claimed in claim 2, wherein the request signal is generated automatically.

4. The method as claimed in claim 3, wherein the enable signal is output whenever the current process sequence at the armature allows for fault-free testing.

5. The method as claimed in claim 1, wherein the enable signal is output whenever the current process sequence at the armature allows for fault-free testing.

6. The method as claimed in claim 1, wherein the armatures are safety armatures.

7. A process control system for testing the functionality of armatures, comprising:
   a control device to control actuation of a safety armature in an emergency; and
   at least one assigned test device for implementing partial stroke testing and which is connected to the control device, which brings about actuation, in accordance with regulations, of the safety armature in an emergency, wherein, prior to the start of the implementation of the partial stroke testing, a request signal is transmitted from the test device to the control device, and wherein an enable signal is output by the control device at least upon the request.

8. The system as claimed in claim 7, wherein the enable signal is issued as a function of the current process sequence at the armature.

\* \* \* \* \*